(12) United States Patent
Marchek

(10) Patent No.: US 7,736,502 B2
(45) Date of Patent: Jun. 15, 2010

(54) TEMPERATURE TRANSFER FILTER PLATE ASSEMBLY

(75) Inventor: Kenneth Marchek, Holland, MI (US)

(73) Assignee: Siemens Water Technologies Corp., Warrendale, PA (US)

( * ) Notice: Subject to any disclaimer, the term of this patent is extended or adjusted under 35 U.S.C. 154(b) by 1 day.

(21) Appl. No.: 12/009,600

(22) Filed: Jan. 18, 2008

(65) Prior Publication Data

US 2008/0190831 A1 Aug. 14, 2008

Related U.S. Application Data

(60) Provisional application No. 60/889,409, filed on Feb. 12, 2007.

(51) Int. Cl.
*B01D 25/21* (2006.01)
(52) U.S. Cl. ..................................................... 210/231
(58) Field of Classification Search .................. 210/231
See application file for complete search history.

(56) References Cited

U.S. PATENT DOCUMENTS

| | | | |
|---|---|---|---|
| 1,049,715 | A | 1/1913 | Hopkins et al. |
| 2,124,861 | A | 7/1938 | Saddington et al. |
| 3,233,733 | A | 2/1966 | Moss |
| 3,390,772 | A | 7/1968 | Juhasz |
| 4,237,009 | A | 12/1980 | Kurita |
| 4,832,840 | A | 5/1989 | Klinkau et al. |
| 4,997,560 | A | 3/1991 | Haeberle |
| 4,999,118 | A | 3/1991 | Beltchev |
| 5,198,123 | A | 3/1993 | Stoever et al. |
| 5,558,773 | A | 9/1996 | Aigeldinger et al. |
| 5,792,348 | A | 8/1998 | Eisinga |
| 6,149,806 | A | 11/2000 | Baer |
| 6,180,002 | B1 | 1/2001 | Higgins |
| 6,280,638 | B1 | 8/2001 | Belchev |
| 6,387,282 | B1 | 5/2002 | Heckl et al. |
| 2006/0032805 | A1 | 2/2006 | Hildebrant et al. |

FOREIGN PATENT DOCUMENTS

| | | | |
|---|---|---|---|
| EP | 0078659 | * | 5/1983 |
| EP | 0759318 | * | 2/1997 |
| EP | 0759318 A1 | * | 2/1997 |
| WO | WO 95/27550 | | 10/1995 |
| WO | WO2004024290 A1 | * | 3/2004 |

OTHER PUBLICATIONS

International Search Report and Written Opinion of the International Searching Authority, mailed May 22, 2008 (6 sheets).

* cited by examiner

*Primary Examiner*—Walter D Griffin
*Assistant Examiner*—Denise R Anderson

(57) ABSTRACT

A temperature transfer filter plate assembly for a filter press includes a temperature transfer filter plate in a filter plate assembly having a plate chamber for receiving heating or cooling fluid. A plurality of apertures extend through the filter plate to enable the flow of liquid therethrough. A filter frame includes a web or divider wall that receives temperature transfer filter plates on opposing sides thereof. The apertures of each temperature transfer filter plate open into respective collecting chambers defined by the inner wall of the temperature transfer filter plate and the divider wall. A flow path arrangement allows removal of the liquid from the collecting chambers in the temperature transfer filter plate assembly. The temperature transfer filter plates generally have inner and outer walls with a wavy or undulating configuration to form the plate chamber therebetween.

15 Claims, 13 Drawing Sheets

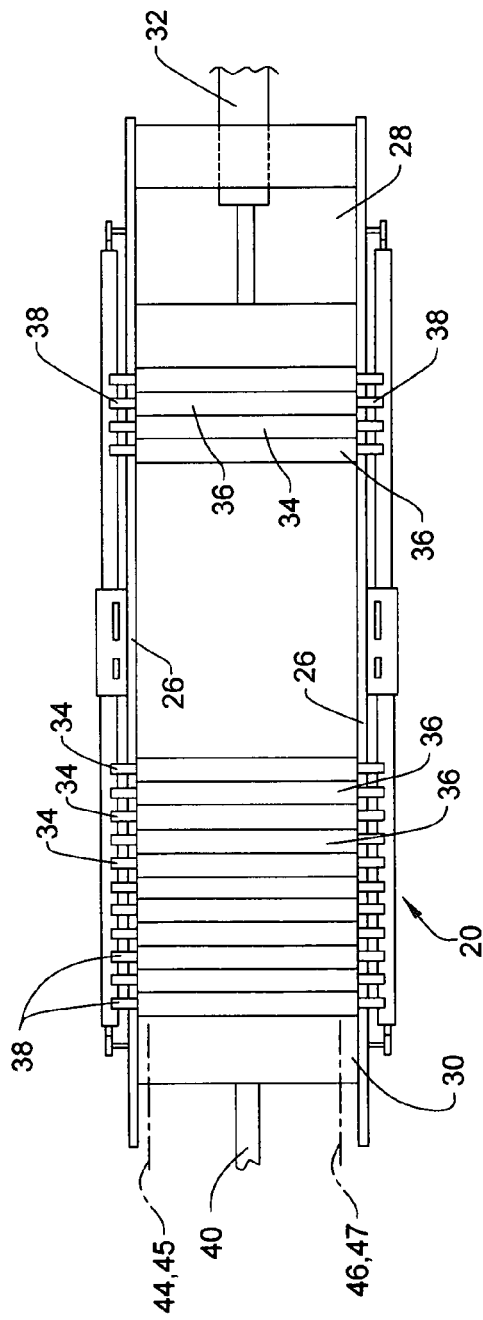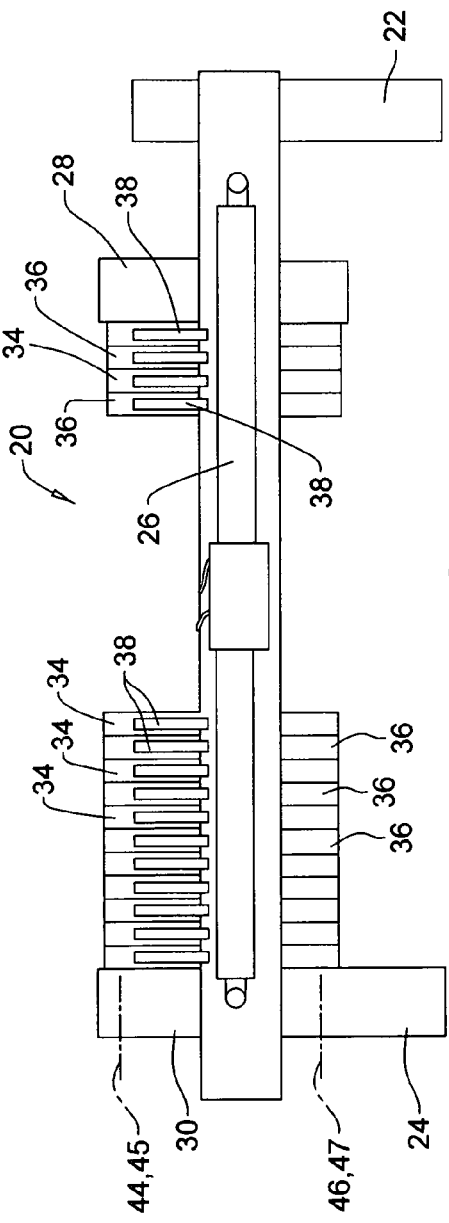

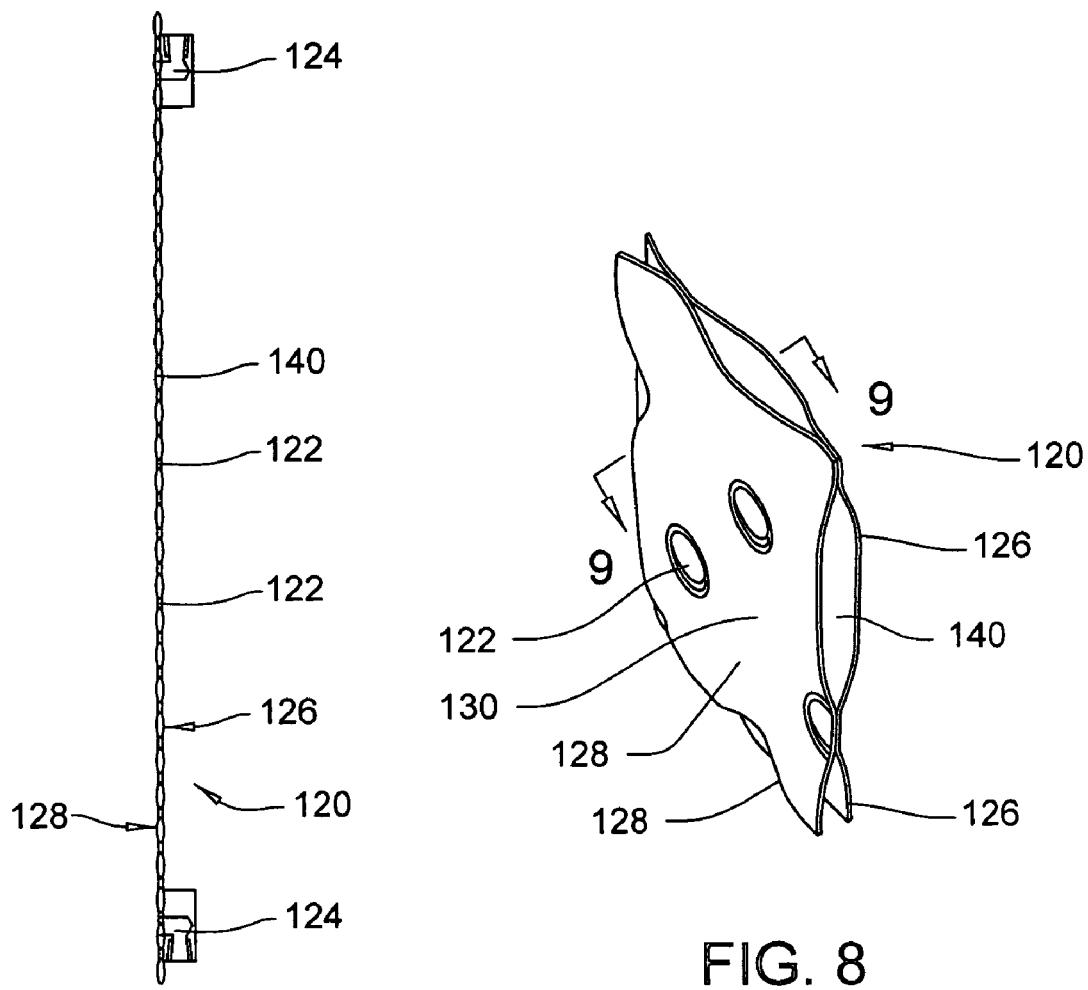

TEMPERATURE TRANSFER FILTER PLATE ASSEMBLY

CROSS-REFERENCE TO PRIOR APPLICATION

This application claims priority under 35 USC §119(e) of provisional application Ser. No. 60/889,409 filed Feb. 12, 2007, the entire disclosure of which is herein incorporated by reference.

FIELD OF THE INVENTION

This invention relates to a filter press for dewatering slurry and, more specifically, to a filter press having an improved temperature transfer filter plate assembly that permits heating or cooling of slurry. The temperature transfer filter plate assembly provides efficient separation of liquid from slurry during forming of a filter cake of solids in filtration chambers between adjacent filter plate assemblies of the filter press.

BACKGROUND OF THE INVENTION

Filter presses are well known and extensively utilized for separating solids from slurries. Such filter presses employ a plurality of filter plates which are held in contacting relationship between a fixed and a movable head member while the slurry is pumped into and through the press for collecting the solids in the form of cake between adjacent filter plates. When the press is full of solids, the movable head is backed away from the plates into an open position and the plates are moved into an open position to permit discharge of the cake which is collected between adjacent pairs of plates. To permit movement of the plates into an open position, plate shifting mechanisms are typically provided adjacent opposite sides of the press for permitting automatic or manual control over plate movement and cake discharge.

Various types of filter plates are utilized in filter presses, depending primarily upon the material to be filtered and the process requirements. For example, one type of plate is a cloth-type chamber plate which includes recessed surfaces on opposite sides of the plate, each of which serves to form a filter chamber with an adjacent plate when the plates are clamped together. A cloth filter covers each of these recessed surfaces, and is either mounted on the plate by a gasket or is draped between two adjacent plates. Thus, slurry is pumped into the filter chambers formed between the filter cloths of two adjacent plates, and the liquid from the slurry passes through the filter cloth and is discharged through filtrate ports in the plates. The solids are trapped in the filter chamber between the adjacent plates and form a cake.

Another type of filter plate which is utilized when process requirements call for production of a dried filter cake is a membrane or diaphragm-type squeeze plate. The construction of this type of plate is similar to the cloth-type chamber plate, but the drainage surfaces on the opposite faces of the plate are flexible diaphragms or membranes which define pressurizing chambers therebehind. A filter cloth covers the outer face of the diaphragm on each side of the plate and typically extends beyond the plate, i.e., the filter cloths are typically draped between the adjacent plates. In this case, slurry is pumped into the filter chambers formed between two neighboring plates and the liquid portion of the slurry passes through the filter cloths and is discharged through filtrate ports in the plates. After the filling cycle is complete and the filter chambers formed between adjacent plates are filled with solids, and before the press is opened, pressurized air or water is supplied to the pressurizing chamber located behind each diaphragm, causing the diaphragms to flex outwardly and exert mechanical pressure on the filter cake. This also effects limited heating of the filter cake which, in conjunction with a vacuum applied to the discharge side of the filter cloths, causes additional moisture to be removed from the filter cake. An example of this type of arrangement and process is disclosed in U.S. Pat. No. 5,558,773. A similar press and process is also sold by the assignee hereof under the designation "J-VAP".

While filter presses employing membrane-type filter plates have provided improvement with respect to removal of liquid from the filter cake, nevertheless such membrane-type filter plates are of limited capability with respect to their ability to provide effective heating of the filter cake to assist in moisture removal by vaporization. It accordingly has been proposed to modify the filter press to include heating plates in conjunction with membrane-type filter plates. In such proposal, as illustrated by U.S. Pat. No. 6,387,282, a plurality of rigid metal heating plates are alternately interposed between the plurality of conventional membrane-type filter plates. Each heating plate is hence clamped between a pair of membrane-type plates when the filter press is closed, whereby each filter chamber is defined between the opposed faces of the adjacent membrane-type filter plate and the adjacent heating plate, and the size of the filtration chamber and hence the capacity thereof is defined principally by the recess formed in the membrane-type filter plate inasmuch as the opposed surface on the heating plate is typically flat. Since the heating plate is constructed of metal and has interior chambers and passages for accommodating a high-temperature heating fluid therein, such heating plate is effective in permitting transfer of significant quantities of heat energy through the metal face of the heating plate into the adjacent filter cake. Such arrangement hence does permit increased heating and accordingly more effective vaporization of the liquid in the filter cake, whereby more effective removal of liquid from the filter cake can be achieved.

With a filter press employing alternating metal heating plates of the type described above, however, the overall construction of the filter press, in order to maintain the same press capacity, increases significantly with respect to the structure and size thereof since the same number of membrane-type filter plates must be maintained, and at the same time a substantially similar number of heating plates are incorporated into the press, thereby significantly increasing the overall size (i.e., length) and also the space requirements and cost of the press.

Other examples of plate-type filter presses employing heating plates to provide more effective heating of filter cake within the press are illustrated by U.S. Pat. Nos. 4,999,118, 1,049,715, and PCT Publication WO 95/27550.

Another filter press employs both membrane filter plates and heating filter plates disposed in alternating fashion along the press, with the plates being constructed so as to maintain press capacity without requiring any significant increase in either the number of required plates or the overall size of the press, while permitting heat to be effectively transmitted into the filter cakes formed in the filtration chambers to effect vaporization thereof. At the same time the filter press permits more effective removal of liquid or vapor from the filter cake, such as during air blowing and vacuum-drawing cycles. This filter press is disclosed in U.S. Patent Publication 2006/0032805, the disclosure of which is incorporated by reference herein in its entirety.

The filter press enables the heating plates to be provided with metal heat transfer surfaces which define one side of each filtration chamber. The overall construction of the remainder of the heat plate employs a frame constructed principally of a non-metal material to permit forming of the heating plates in a more economical and more consistent manner similar to the construction of the membrane-type filter plates.

When a filter press is closed, a filtration chamber is defined by opposed recesses defined between each adjacent contacting pair of membrane and heating plates, whereby a membrane can effect squeezing of the filter cake in the chamber from one side thereof, and the heating surface on the opposed plate can effect heating of the filter cake from the opposite side thereof. Each of the membrane and heating plates has porting associated therewith which preferably communicates with upper and lower extremities of the filtration chamber, with the upper and lower ports in the membrane plate preferably being substantially diametrically opposite the respective lower and upper ports formed in the opposed heating plate. The diametrically opposed upper and lower ports formed in the membrane and heating plates permit air to be effectively blown into and through the filter cake, with the air passing both transversely across the width of the filter cake and longitudinally through the thickness thereof, to significantly assist in removing liquid or vapor from the filter cake. In addition, the lower ports formed in the opposed membrane and heating plates permit communication to be established with the lower extremity of the filtration chamber adjacent both sides of the filter cake so as to permit more effective drainage of liquid therefrom.

The heating plates are defined by frames constructed of a plastic material so as to have a construction similar to the plastic frames defining the membrane filter plates, and the heat transfer surfaces are preferably defined by thin metal plates, such as of stainless steel, which are fixed to opposite sides of the plastic frame and extend over substantially the entire bottom of the recesses formed in opposite sides thereof so as to provide a high-efficiency heat transfer surface which contacts the filter cake over substantially the entirety of one side of the filtration chamber. With this arrangement, the high-temperature heating fluid supplied to and through the interior of the heating plate permits more effective transfer of heat to the metal heating plate, particularly since the plastic frame of the heating plate has a much smaller heat transfer capability and exerts minimal impact as a heat sink relative to its effect on removal of heat energy from the heating fluid.

In the above arrangement, however, the heating plate does not allow the passage of liquid or vapor therethrough. Thus, the surface area of the filter cloth through which suction is drawn to remove liquid is generally limited to areas about the periphery of the heating plate.

An object of the invention is to provide a filter press with an improved temperature transfer filter plate assembly for enhancing the removal of liquid and vapor when forming a filter cake between a membrane filter plate assembly and a temperature transfer filter plate assembly.

The present invention results in improved removal of liquid from a filter cake by providing a plurality of apertures extending through a temperature transfer filter plate. The temperature transfer filter plate is formed by shaping the inner and outer walls in a wavy or undulating configuration. Holes or apertures in alignment on the inner and outer walls contact and open into each other and are sealed thereabout forming a temperature transfer plate chamber defined between the inner and outer walls. Thus, the temperature transfer plate chamber that allows heating or cooling fluid to pass therethrough has spaced apertures extending therethrough in a predetermined pattern. The fluid enters the plate chamber on one side near an edge thereof and passes within the chamber around the sealed apertures.

The temperature transfer filter plate is part of a temperature transfer filter plate assembly having a filter frame with a divider wall or web for receiving filter plates on opposing sides thereof. Collecting chambers are defined between the inner wall of each respective filter plate and the respective facing side of the divider wall.

The arrangement enables flow of liquid from a filter cake through a filter cloth and then through the spaced apertures of the temperature transfer filter plate and into the collecting chamber. Thus, dewatering at the surface of the metallic temperature transfer filter plate is provided. The liquid in the collecting chamber is removed therefrom through a flow path arrangement in the filter frame.

Other objects and purposes of the present invention will be apparent to persons familiar with constructions of this general type upon reading the following specification and inspecting the accompanying drawings.

BRIEF DESCRIPTION OF THE DRAWINGS

FIGS. 1 and 2 are diagrammatic top and side views, respectively, of a conventional filter press incorporating therein alternating membrane filter plate assemblies and alternating temperature transfer filter plate assemblies according to the present invention.

FIG. 7 is a cross section view of a temperature transfer filter plate taken generally along 7-7 in FIG. 6.

FIG. 8 is a perspective view of a small portion of the temperature transfer filter plate of FIG. 6.

DETAILED DESCRIPTION

Figure 3:
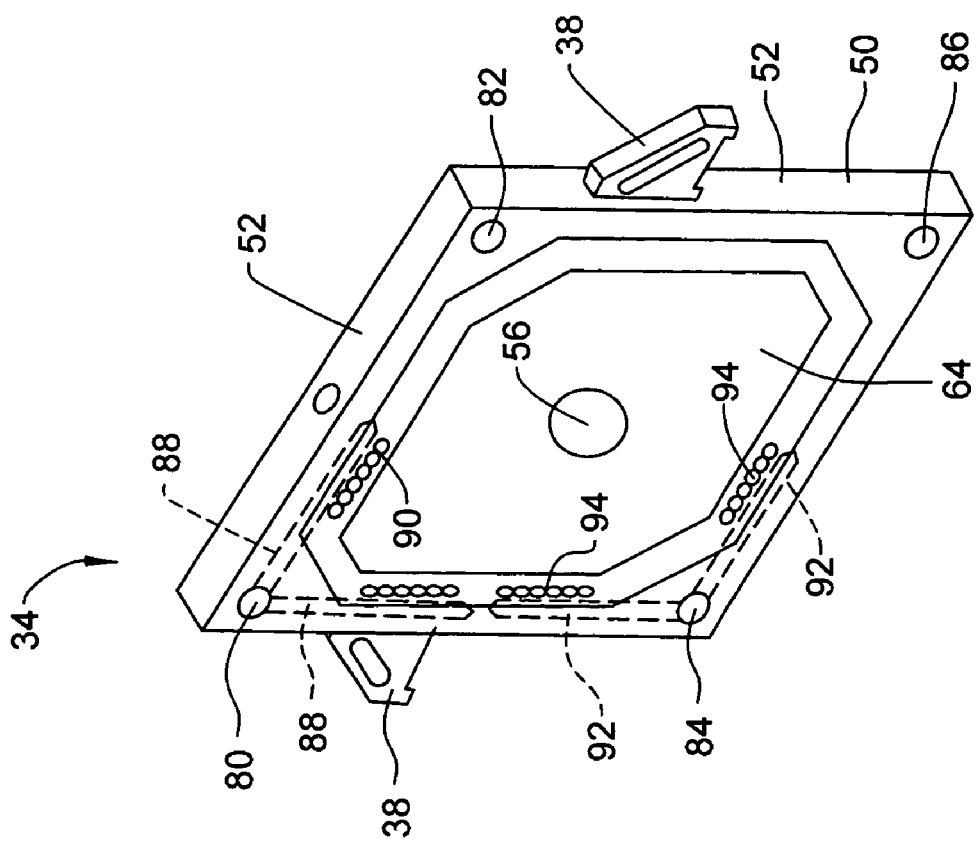
FIG. 3 is a perspective view of a known membrane filter plate assembly.

As shown in FIGS. 1 and 2, there is illustrated a filter press 20 having a pair of end supports 22, 24 rigidly joined by a pair of generally parallel and horizontally elongate side rails 26. The side rails 26 are sidewardly spaced apart and cooperate with the end supports 22, 24 to define a generally rigid frame.

The filter press 20 has a movable follower or head 28 disposed adjacent one end of the filter press and slidably supported for movement along the side rails 26. The movable head 28 is slidably displaceable horizontally along the side rails 26 toward and away from a further fixed head 30 that is fixed to the frame adjacent the other end of the filter press 20. A drive device 32, such as a conventional double acting pressure cylinder, is mounted on the frame and cooperates with the movable head 28 for controlling movement of the movable head either toward or away from the fixed head 30.

A plurality of filter plate assemblies, namely alternating membrane filter plate assemblies 34 and temperature transfer filter plate assemblies 36, perform the filtering function for the filter press 20. The filter plate assemblies 34, 36 are suspendedly supported on and between the side rails 26. The filter plate assemblies 34, 36 extend generally transversely between the side rails 26 so that the filter plate assemblies are disposed in adjacent relationship to form a generally horizontally extending stack of filter plate assemblies in the longitudinal direction of the filter press 20. Each filter plate assembly 34, 36 has support arms or handles 38 that project outwardly from opposite sides of the respective filter plate assembly in overlapping and slidable supportive engagement with respective upper edges of the side rails 26. The support arms 38 and side rails 26 enable the filter plate assemblies 34, 36 to be slidably displaced along the side rails in the longitudinal direction of the filter press 20.

Figure 5:
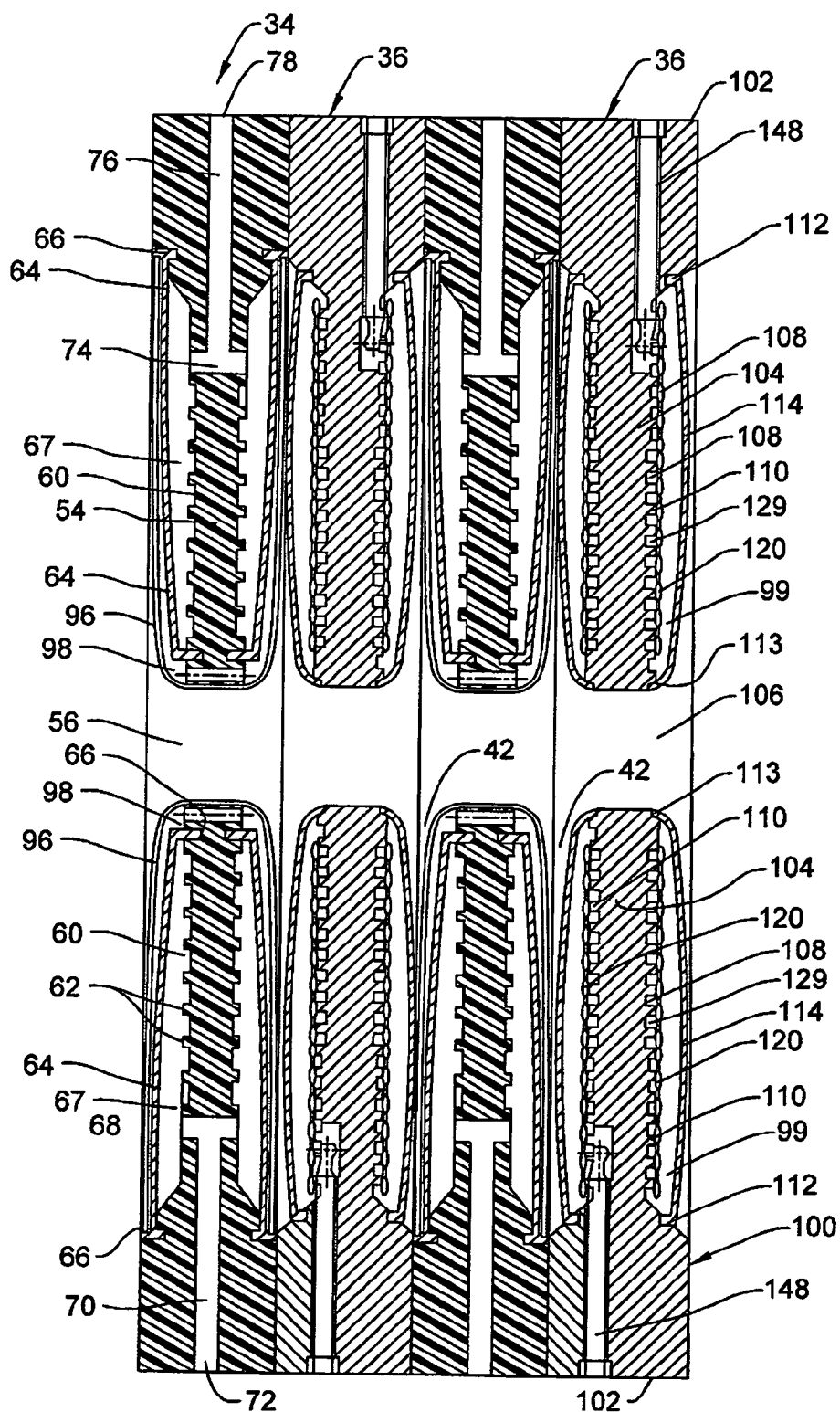
FIG. 5 is a central longitudinally extending cross section through a filter plate assembly stack including two membrane filter plate assemblies alternating with two temperature transfer filter plate assemblies, when the press is in a closed position.

As is conventional, the drive device 32 is activated to move the movable head 28 forwardly (leftwardly in FIGS. 1 and 2) so that the stack of filter plate assemblies 34, 36 is snugly and tightly held between the opposed heads 28, 30. FIG. 1 shows a suitable sludge or slurry conduit 40 connected to the fixed head 30 for communication with an interior of the stack of filter plate assemblies 34, 36. The slurry conduit 40 supplies sludge or slurry into filtration chambers 42 defined between the adjacent filter plate assemblies 34, 36 of the stack as shown in FIG. 5. A plurality of filter press conduits 44, 45, 46, 47 (shown diagrammatically in FIG. 1) connect to the fixed head 30 of the filter press 20 for communication with passages or ports that extend through the stack of filter plate assemblies 34, 36, and typically along the corners of the filter plate assemblies for permitting communication with each filter plate assembly for various operational functions during operation of the filter press 20. Such filter press conduits 44-47 typically have there own individual control valves (not shown) associated therewith to permit the desired press function to be carried out.

To permit removal or dumping of solids (i.e., filter cake) which collects in the filtration chambers 42 defined between adjacent filter plate assemblies 34, 36, the movable head 28 is moved rightwardly into an open position substantially as illustrated in FIGS. 1 and 2. The filter plate assemblies 34, 36 are then individually and sequentially moved rearwardly (rightwardly in FIG. 2) away from the stack toward the movable head 28 to permit solids collected between adjacent filter plate assemblies to drop downwardly for deposit into a suitable collecting bin (not shown). The sequential and individual movement of the plate assemblies 34, 36 away from the rest of the stack is controlled by a conventional known plate-shifting mechanism.

Considering the construction of the known membrane-type filter plate assembly 34, and referring to FIGS. 3 and 5, the membrane-type filter plate assembly 34 includes a frame 50 with an outer ring-like peripheral edge portion 52 that is generally rectangular in shape and has generally flat and substantially parallel faces located at opposite sides thereof. The frame 50 includes a center portion or divider wall 54, shown in FIG. 5, which is rigidly joined to and defines essentially the entire center within the peripheral edge portion 52. As shown in FIGS. 3 and 5, the divider wall 54 has a center opening 56 extending transversely therethrough. The peripheral edge portion 52 and the divider wall 54 of the frame 50 are preferably integral with one another, and typically comprise a molded plastic, such as polypropylene. The divider wall 54 is reduced in thickness compared to the peripheral edge portion 52 so as to define outwardly oriented faces 60 on opposite sides thereof. The faces 60 are defined on opposing sides of the divider wall 54. Each face 60 is typically provided with a non-smooth surface, such as a ribbed surface or a generally rectangular array of transversely spaced projections or pips 62 as shown in FIG. 5.

The known membrane filter plate assembly 34 also includes flexible membranes or diaphragms 64 spaced from and extending across the divider walls 54. The membrane 64 preferably is a thin flexible sheet of liquid impermeable elastomeric material, for example neoprene with nylon fabric reinforcement, and has a relatively small thickness so as to provide the membrane 64 with significant flexibility while at the same time providing significant heat transmission efficiency therethrough.

With the flexible membrane 64 mounted on the frame 50, a squeeze chamber 67 is defined between the membrane 64 and the adjacent face 60 of the divider wall 54. The flexible membrane 64 extends across the respective shallow squeeze chamber 67 so that the flexible membrane 64 has a surrounding peripheral edge portion retained in an outer annular or ring-like groove 66 formed in the face of the frame that surrounds the face 60 of the divider wall 54. A further annular groove 66 surrounds the center opening 56. Suitable retaining strips or fasteners can be provided, in a conventional manner, to assist in securing the peripheral edge portion of the flexible membrane 64 within the outer groove 66 and the inner edge portion within the inner groove 66.

To supply squeeze fluid (i.e., air or liquid) to the squeeze chamber 67, the frame 50 has a passage 68 formed through center divider wall 54 and in communication with the respective squeeze chambers 67 defined on opposite sides thereof. The passage 68 is oriented transverse to the divider wall 54. As shown in FIG. 5, this transverse passage 68 communicates with an inner end of a flow passage 70 that projects through the frame 50. Passage 70 terminates at a port 72 defined at the lower edge of the frame. A similar passage 74 is formed transverse to the center divider wall 54 of the frame 50 and adjacent the upper side thereof. Passage 74 communicates with one end of a flow passage 76 that projects through the frame and terminates at a port 78 defined in the upper edge of the frame. One of the ports, for example the lower port 72, couples to a suitable supply conduit which supplies a squeeze fluid, such as pressurized air or liquid, into the squeeze chambers 67 disposed on opposite sides of the divider wall 54. The squeeze fluid can be discharged from the squeeze chambers 67 through the upper passage 76 at the port 78 thereof, which port 78 connects to a suitable discharge conduit.

As shown in FIG. 3, the frame 50 has associated with each membrane filter plate assembly 34, adjacent the respective four corners thereof, corner ports or passages 80, 82, 84, 86 extending transversely through the thickness of the frame 50 so as to terminate at the opposite side faces thereof. These ports 80, 82, 84, 86 align with corresponding ports formed in the other filter plate assemblies 36 when the filter plate assemblies are stacked together so as to define continuous flow passages that extend lengthwise throughout the plate assembly stack. Appropriate seals can be provided in a conventional manner around the ports 80, 82, 84, 86 at the side faces of the frame 50 to create a seal between adjacent contacting filter plate assemblies 34, 36 as necessary.

At least an upper and lower one of the ports 80, 82, 84, 86, and more typically upper and lower ports adjacent the same side of the frame 50, are disposed for communication with the filtration chambers 42 shown in FIG. 5 and defined between adjacent facing sides of the respective opposed pairs of filter plate assemblies 34, 36. For example, as shown in FIG. 3, the upper port 80 communicates with a closed-ended passage 88 defined within the frame 50 (shown in dashed line) that extends vertically a limited extent along the edge of the frame 50 and which in turn communicates with a plurality of small passages or ports 90 that extend transversely so as to open outwardly adjacent the front face of the respective membrane 64 to communicate through a filter cloth 96 with the respective filtration chamber 42. In the illustrated embodiment, passages 88 are formed for communication with the ports 80 and project away therefrom along adjacent vertical and horizontal edge portions 52 of the rectangular frame 50 so as to terminate at one of the ports 90. The ports 90 open into the respective filtration chambers 42 on either side of the frame 50 along respective lengths and adjacent an upper corner thereof.

The lower port 84 disposed adjacent a lower corner of the frame 50 on the same side as the port 80 similarly communicates with one or in the illustrated embodiment, two passages 92 that connect extend along the frame 50 and at their inner ends communicate with transverse passages or ports 94 that are defined forwardly of the respective membrane 64 so as to communicate with the lower corner of the respective filtration chamber 42 through the filter cloth 96.

The ports 82, 86 provided adjacent the other side of the frame 50 typically function solely as flow through passages at least with respect to assemblies 34 and thus typically do not have internal connecting passages within the respective frame 50.

Both sides of the membrane filter plate assembly 34 are preferably covered by a suitable thin filter cloth 96 shown in FIG. 5 that readily permits liquids to flow therethrough, but which restricts passage of solids therethrough. Such cloth 96 may, for example, comprise a thin sheet of woven polypropylene. The filter cloth 96 is mounted on the frame 50 so as to extend across the respective face 60 and is positioned so as to extend exteriorly over the outer face of the membrane 64. The membrane outer surface may be provided with a suitable texture or roughness, if desired, so as to prevent the filter cloth 96 from adhering thereto. The liquids (i.e., filtrate) passing though the filter cloth 96 enter into a liquid receiving chamber 98 that is defined between the filter cloth 96 and the entire outer face of the membrane 64. The liquid chamber 98, at the outer edges thereof, communicates with the ports 90 and 94.

The filter cloths 96 may extend entirely across the faces of the filter plate assembly 34 so as to be secured exteriorly of the frame 50, or may be secured directly to the respective faces of the frame 50 by suitable retainer rings, such being conventional or well known.

The construction and function of the membrane filter plate assembly 34 is generally conventional, and further detailed description thereof is believed unnecessary.

Temperature Transfer Filter Plate Assembly

Figure 4:
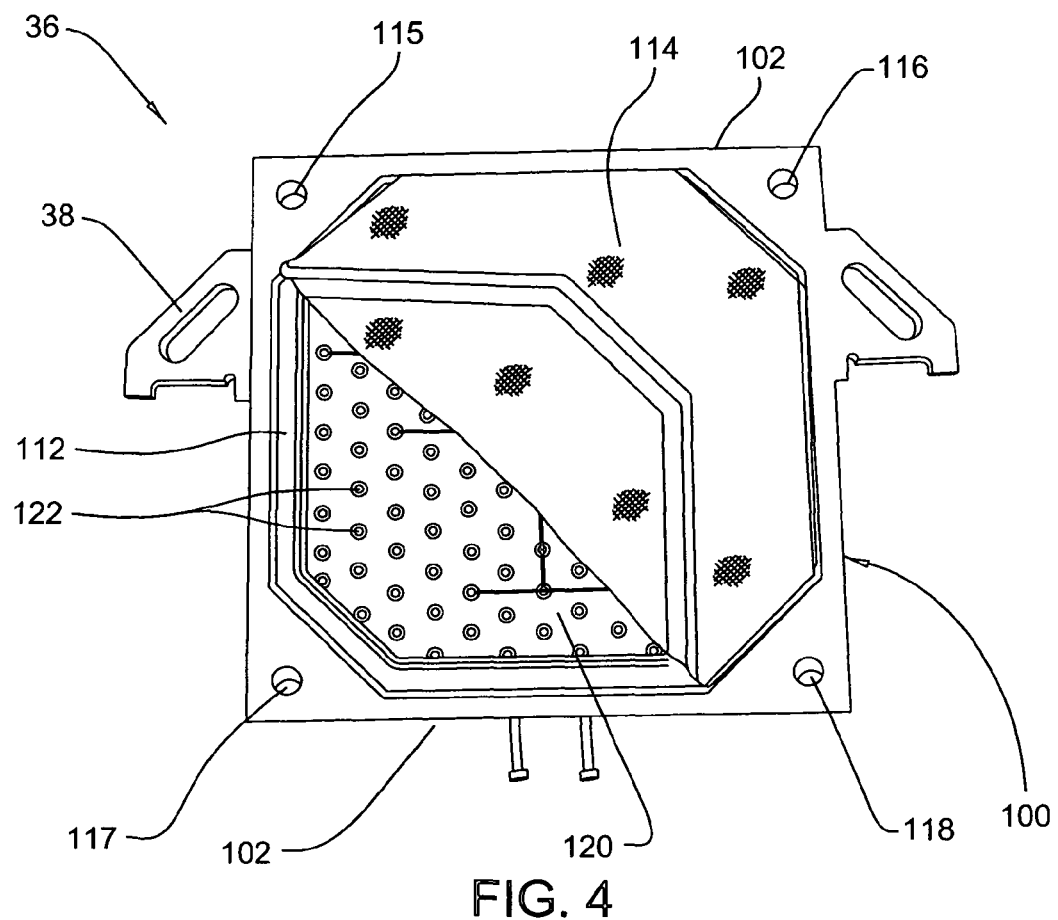
FIG. 4 is a front view of a temperature transfer filter plate assembly according to the invention.

The temperature transfer filter plate assembly 36 according to the invention is illustrated in FIGS. 4 and 5. In FIG. 4, the temperature transfer filter plate assembly 36 includes a temperature transfer filter frame 100 having an outer ring-like peripheral edge portion 102 that is generally rectangular and flat with substantially parallel faces on opposite sides thereof. The frame 100 also includes a divider or center wall 104 shown in the cross sectional view of FIG. 5. FIG. 5 also illustrates a center opening 106 for the temperature transfer filter plate assembly 36 that corresponds in location to the center opening 56 in the membrane filter plate assembly 34.

In some embodiments, the frame 100 is formed in one monolithic piece from a plastic material, such as polypropylene. The center wall 104 has a reduced thickness relative to the peripheral edge portion 102 of the frame 100 so as to define shallow recesses 108 opening outwardly from respective opposite sides thereof. The shallow recesses 108 are further defined by spaced projections 110 projecting outwardly from frame 100 substantially transverse to the divider wall 104. In some embodiments, the shallow recesses 108 may be oriented in a vertical direction, and in other embodiments the recesses may be oriented at 45 degrees or other angular orientations. In many embodiments a pipped surface is utilized instead of the shallow recesses 108.

FIGS. 4 and 5 also show grooves 112, 113 provided in the frame 100. The grooves 112, 113 are configured to receive a filter cloth 114 to secure cloth 114 to frame 100. Cloth 114 may be secured within grooves 112, 113 via known means. In the illustrated embodiment, outer groove 112 is located outwardly of and in surrounding relation with center wall 104. Inner groove 113 is located about the center opening 106 and receives an inner peripheral edge of the filter cloth 114, which is secured therein by suitable means.

As shown in FIG. 4, the temperature transfer filter frame 100 has associated with each temperature transfer filter plate assembly 36 adjacent the four corners thereof, corner ports or passages 115, 116, 117, 118 extending transversely through the thickness of the frame 100 so as to terminate at the opposite side faces thereof. These ports 115-118 align with corresponding ports 80, 82, 84, 86 formed in the other membrane filter plate assemblies 34 when the filter plate assemblies are stacked together so as to define continuous flow passages that extend lengthwise throughout the plate assembly stack. Appropriate seals can be provided in a conventional manner around the ports 115-118 when they terminate at the side faces of the frame 100 to create a seal between adjacent contacting filter plate assemblies 34, 36, as necessary.

Temperature transfer filter plates 120 are located on opposing sides of the center wall 104 of each frame 100 and mounted thereto. The temperature transfer filter plate 120 illustrated in FIGS. 6 and 7 includes a plurality of apertures 122 (only some of which are labeled) extending therethrough so as to open through opposite sides of the plate 120. In the illustrated embodiment, these apertures 122 are disposed in a generally uniform array across the extent of the temperature transfer filter plate 120, although other configurations are within the scope of the invention. Further, opposing peripheral edges of the temperature transfer filter plate 120 include inlet/outlet projections 124 for connection to a heating or cooling fluid source.

In FIG. 7, the temperature transfer filter plate 120 has a wall structure that is defined by an inner wall or face 126 and an outer wall or face 128. The outer wall 128 faces away from the divider wall 104 and the inner wall 126 faces toward the divider wall 104. A temperature transfer filter plate assembly fluid collecting chamber 129 (FIG. 5) is defined between the divider wall 104 and the inner wall or face 126 of the filter plate 120.

FIG. 8 is a cross sectional view of a small section of the temperature transfer filter plate 120. The outer and inner walls 126, 128 of the temperature transfer filter plate 120 have a wavy or undulating configuration 130 across the cross section thereof. A temperature transfer plate chamber 140 is formed between the walls or faces 126, 128 of the temperature transfer filter plate 120. The temperature transfer plate chamber 140 may also be defined as pockets or hollow spaces between adjacent apertures 122. The pockets open into adjacent pockets to form the plate chamber. Pockets are also defined between peripheral edges of the wall structure and adjacent apertures 122. In FIG. 8, the undulating configuration 130 is provided for both the inner and outer walls 126, 128 of the temperature transfer filter plate 120.

Method of Making the Temperature Transfer Filter Plate

Figure 9:
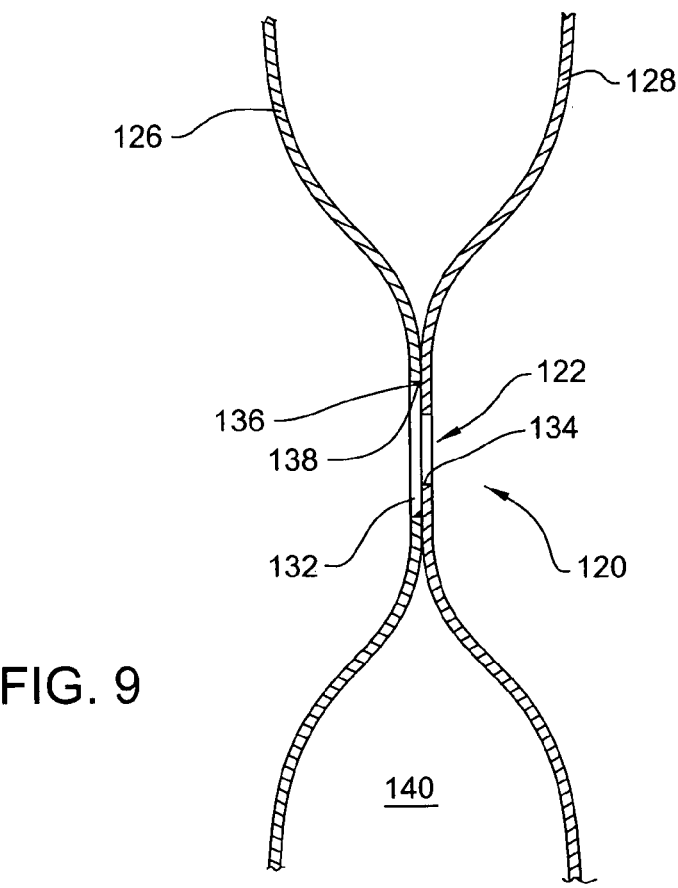
FIG. 9 is a cross section taken generally along 9-9 in FIG. 8.

Assembly and construction of the temperature transfer filter plate 120 is illustrated in part by the partial cross section of a portion of the filter plate illustrated in FIG. 9.

In FIG. 9, large diameter bore holes 132 of the inner wall 126 and smaller diameter bore holes 134 of the outer wall 128, together define the open bore apertures 122 extending through the temperature transfer filter plate 120, as discussed above.

In making the temperature transfer filter plate 120, the inner and outer walls 126, 128 begin as flat and preferably rectangular walls 126, 128 for orientation in surface-to-surface relationship with each other. The outer wall 128 has a slightly greater length and width than the inner wall 126.

Figure 10:
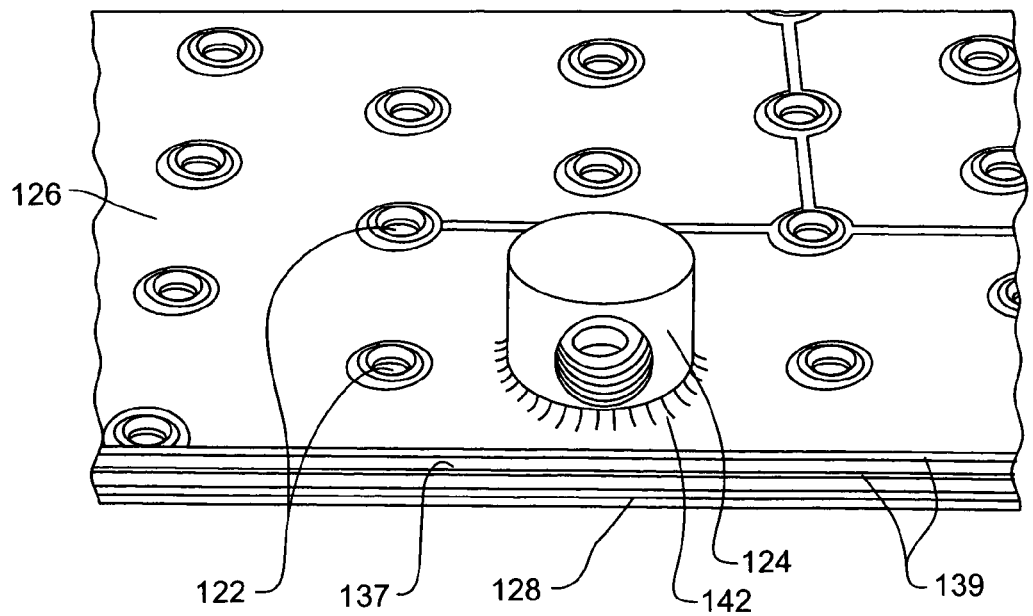
FIG. 10 is a perspective view of the rear side of the temperature transfer filter plate.

In a first step, the holes 132, 134 are formed in the inner and outer walls 126, 128. The holes 132, 134 are then aligned with one another, and a welding or other type of sealing joint is provided between the walls 126, 128 along the outer circumference 136 of hole 132 defining a lip as illustrated by weld 138 in FIG. 9. A similar weld 139 can be provided along the periphery of the inner wall 126 at a peripheral lip 137 as shown in FIG. 10. In one embodiment, the sealing joints are formed by laser welding. Thus, the temperature transfer filter plate 120 comprises at this stage two flat walls 126, 128 substantially in surface to surface contact with each other and sealingly welded about the periphery thereof and about the circumferences of the plurality of apertures 122 spaced thereon and extending therethrough.

In another method of making step, inlet/outlet connectors 124, preferably having a cylindrical shape, are welded at spaced locations near peripheral edges of the temperature transfer filter plate 120. FIG. 10 clearly shows how an inlet/outlet connector 124 is joined to the inner wall 126 of the temperature transfer filter plate 120 by a weld 142.

In another step, high pressure water/air is provided through an opening such as an inlet/outlet connector 124 on one side or edge between the walls 126, 128 to apply pressure therebetween. The two flat walls 126, 128 expand, and form the wavy or undulated configuration 130 of the inner and outer walls 126, 128. The welds forming the apertures 122 passing through the walls 126, 128 of the temperature transfer filter plate 120 remain sealed. The outer lip 137 about the periphery of the plate remains sealed. Thus, a temperature transfer plate chamber 140 is formed between the walls 126, 128 having apertures 122 that extends inwardly from the outer lip 137 of the walls 126, 128. The wavy or undulating configuration 130 across the cross section of the inner wall 126 and the outer wall 128 as shown in FIGS. 7-9 is formed.

In a first embodiment, center opening 106 is also provided through. the inner and outer walls 126, 128 of plate 120. It will be appreciated that this center opening 106 may be collectively formed via different-sized openings defined in the respective walls 126, 128 as discussed above relative to apertures 122. Thus, a welding seal is provided at the center opening 106 in a similar manner as discussed above with respect to the apertures 122. Then pressure is applied to expand the walls resulting in the pattern shown in FIG. 6.

In some embodiments, the inlet/outlet connectors 124 are made from a metal material, along with the inner and outer walls 126, 128 to provide good heat conductivity. The inner wall 126 of the temperature transfer filter plate 120 can be provided with a coating for an insulating effect that maximizes heat or cold radiation outwardly from and through the outer wall 128 of the temperature transfer filter plate 120 and toward the slurry.

Operation

In operation, the membrane and temperature transfer filter plate assemblies 34, 36 are arranged so that the center openings 56, 106 are in alignment with each other and communicate with slurry supply conduit 40.

With the filter press 20 in a closed position, a solid-liquid slurry is pumped into the filter press through slurry conduit 40 so that slurry flows through the openings 56, 106 and fills the filtration chambers 42 between the respective filter plate assemblies 34, 36. During filling of the filtration chambers 42, the pressure of the slurry supplied affects solid-liquid separation in that a significant quantity of liquid will typically flow through the filter cloths 96, 114.

For the membrane filter plate assembly 34, the liquid collects in liquid receiving chamber 98 and then passes through the ports 90, 94 into passages 88, 92 and exits the filter plate assembly 34 through corner ports 80, 84.

In the temperature transfer filter plate assembly 36, the liquid passes through the filter cloth 114 into a cavity 99 shown in FIG. 5 and then through the apertures 122 of the temperature transfer filter plates 120. The liquid is then collected in the respective temperature transfer filter plate collecting chambers 129. In one embodiment, the liquid in the collecting chambers 129 is removed via passages and ports (not shown) in the filter plate assembly 36 that generally correspond to the known arrangement for the membrane filter plate assembly 34 as discussed above. The passages and ports typically connect to port 115 which opens into port 80 of the adjacent membrane filter plate assembly 34. Further, additional passages may be provided that connect to port 117 for removal of liquid from the collecting chamber 129. In other embodiments, a single drainage passage that opens into port 115 is provided that connects to and removes fluid from each of the collecting chambers 129. Suction generally is applied to assist in the removal of liquid and vapor from the collecting chambers 129. In operation the filter plate assemblies 34, 36 interact with each other to provide suction from a vacuum source so that vapor and liquid can be removed from the filter cakes and received in passages 80, 84, 115, 117.

Applicants' FIG. 5 shows inlet/outlet passages 148 that can provide hot or cold fluid to the temperature transfer plate chambers 140 of the temperature transfer filter plates 120 from a fluid source through the inlet/outlet connectors 124. In this embodiment the inlet/outlet passages 148 join to hoses 150, 154 through couplings 152, 156 as shown in the FIG. 12 embodiment. Heating or cooling of slurry may improve the passage of liquid from the slurry or filter cake through the filter cloth 114 and the plurality of apertures 122 opening into the collecting chamber 129. Suction through respective passages or ports then causes liquid and vapor to pass through the apertures 122 into the collecting chamber 129 and then through passages in the respective filter plate frames 50, 100 to ports 80, 115 and/or ports 84, 117 for removal from the filter press 20.

Further, as is known in the art, a pressurized squeeze fluid is periodically supplied through passages 70, 76 and into the squeeze chambers 67 to expand the flexible membranes 64 of the membrane filter plate assemblies 34. The expansion compresses the filter cake between the filter plate assemblies 34, 36 to assist in squeezing additional liquid from the filtration chambers 42.

More specifically, when the pressurized squeeze fluid enters the squeeze chambers 67 of the membrane filter plate assembly 34, the flexible membranes 64 expand. The expansion provides a force onto the filter cake from the membranes 64 through the filter cloths 96 of the membrane filter plate assemblies 34, and toward the filter cloths 114 of the adjacent temperature transfer filter plate assemblies 36. The pressurization of the membrane filter plate assembly 34 effects solid-liquid separation in a significant quantity of the filter cake in the filtration chambers 42. While the pressurization of the filter press 20 results in a maximum discharge of liquid, a suction is applied through port 115 and/or port 117, and then through passages to the collecting chamber 129 defined inwardly behind the plate 120 to remove fluid or vapor so that a relatively high concentration of mainly solids remains in the filter cake between the filter cloths 96, 114.

Simultaneously with, or subsequent to the squeezing of the filter cake, an air blow operation can be undertaken so as to effect removal of moisture from the filter cakes. During air blow, valves associated with diagonally opposite conduits 44, 47 shown in FIG. 1 open so that pressurized air can be supplied through one or both of the conduits 44 or 47 into a passage defined by port 80 and/or port 84. The air in the port is then supplied through the upper transverse passages 88 and ports 90 associated with the membrane filter plate assembly 34 into the upper corners of the filtration chambers 42 and/or into the lower passages 92 and ports 94 associated with the lower corners of the filtration chambers 42. The air then flows diagonally downwardly through the filter cake and also flows longitudinally across the filter cake, so as to force liquid and vapor through a corresponding port to remove additional moisture.

If desired, a second air blow cycle may be carried out in the opposite direction by closing the valves associated with conduits 44, 47 and opening the valves associated with conduits 45, 46, whereby pressurized air is then supplied upwardly and longitudinally across and through the filter cake.

Similar air blow cycles are also provided for the temperature transfer filter plate assemblies 36 through similar passages and ports that open into corner ports 115-118.

As discussed above, hot or cold fluid from a temperature fluid source can be supplied into and through the temperature transfer plate chamber 140 via passages 148 and connectors 124 to effect heating or cooling of the metal temperature transfer filter plates 120 which heat or cool the filter cake. Such heating or cooling increases the removal of liquid from the filter cake.

In some embodiments, a hot squeeze liquid is provided to the squeeze chambers 67 and contacts the membranes 64 of the membrane filter plate assemblies 34 to not only effect expansion thereof, but to also permit at least limited heat transfer through the membranes 64 to the adjacent filter cake to assist in heating of the filter cake and removal of liquid therefrom.

With the above process, and in conjunction with the alternating arrangement of heating and membrane filter plate assemblies 34, 36, maximum drainage from the filter chambers 42 can be achieved since both the membrane filter plate assemblies 34 and the temperature transfer filter plate assemblies 36 employ drainage ports in communication with fluid collecting chambers 98, 129.

Further, the plurality of apertures 122 of the temperature transfer filter plates 120 that are spaced across substantially the entire surface thereof provide more and easier travel paths for liquids or vapors passing through the filter cloth 114. This arrangement increases the flow of liquid into the temperature transfer filter plate assembly collecting chamber 129 and then to the respective exit passages and ports. Thus, the disclosed arrangement facilitates a more efficient and effective removal of moisture from a filter cake, thereby permitting improved drying thereof within the filter press 20.

ADDITIONAL EMBODIMENTS

Figure 6:
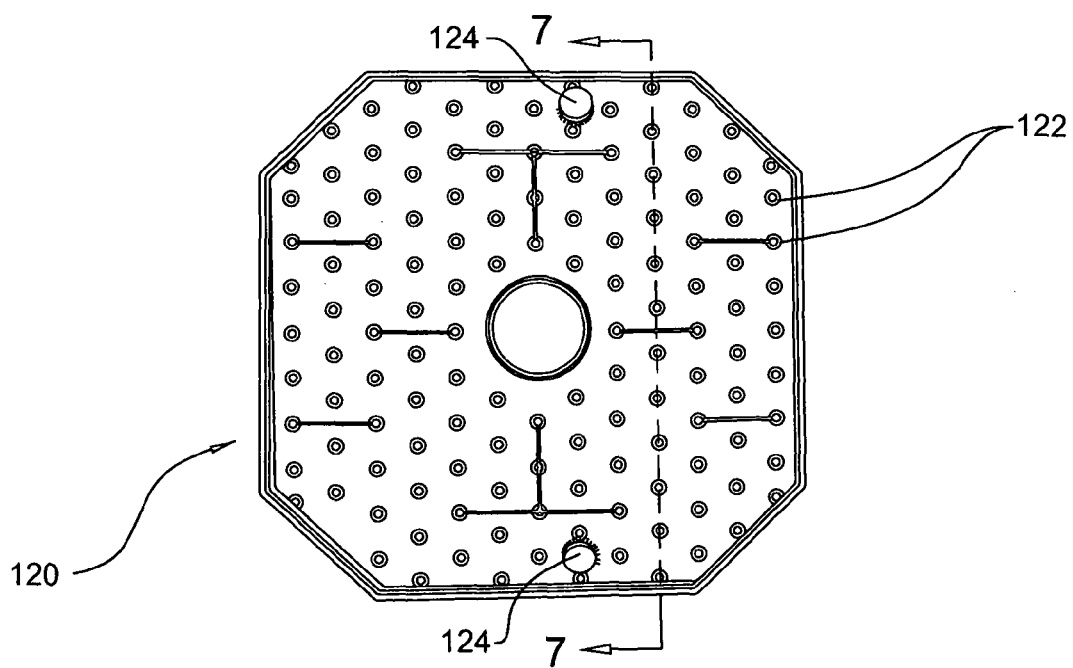
FIG. 6 is a front view of a temperature transfer filter plate according to the invention.
Figure 11:
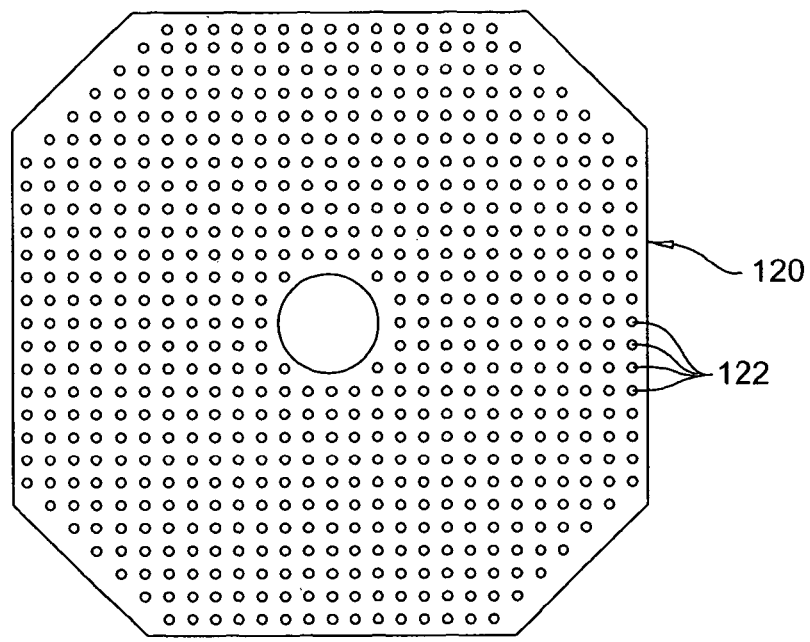
FIG. 11 is a front view of another embodiment of the temperature transfer filter plate.

FIG. 11 shows another embodiment of a temperature transfer filter plate similar in structure to the embodiment of FIG. 6. Temperature transfer filter plate 120, however, includes a greater number of through bore apertures 122 extending through the filter plate. Other aspects of the temperature transfer filter plate 120 in FIG. 11 generally correspond to the temperature transfer filter plate illustrated in FIG. 6 and discussed above.

Figure 12:
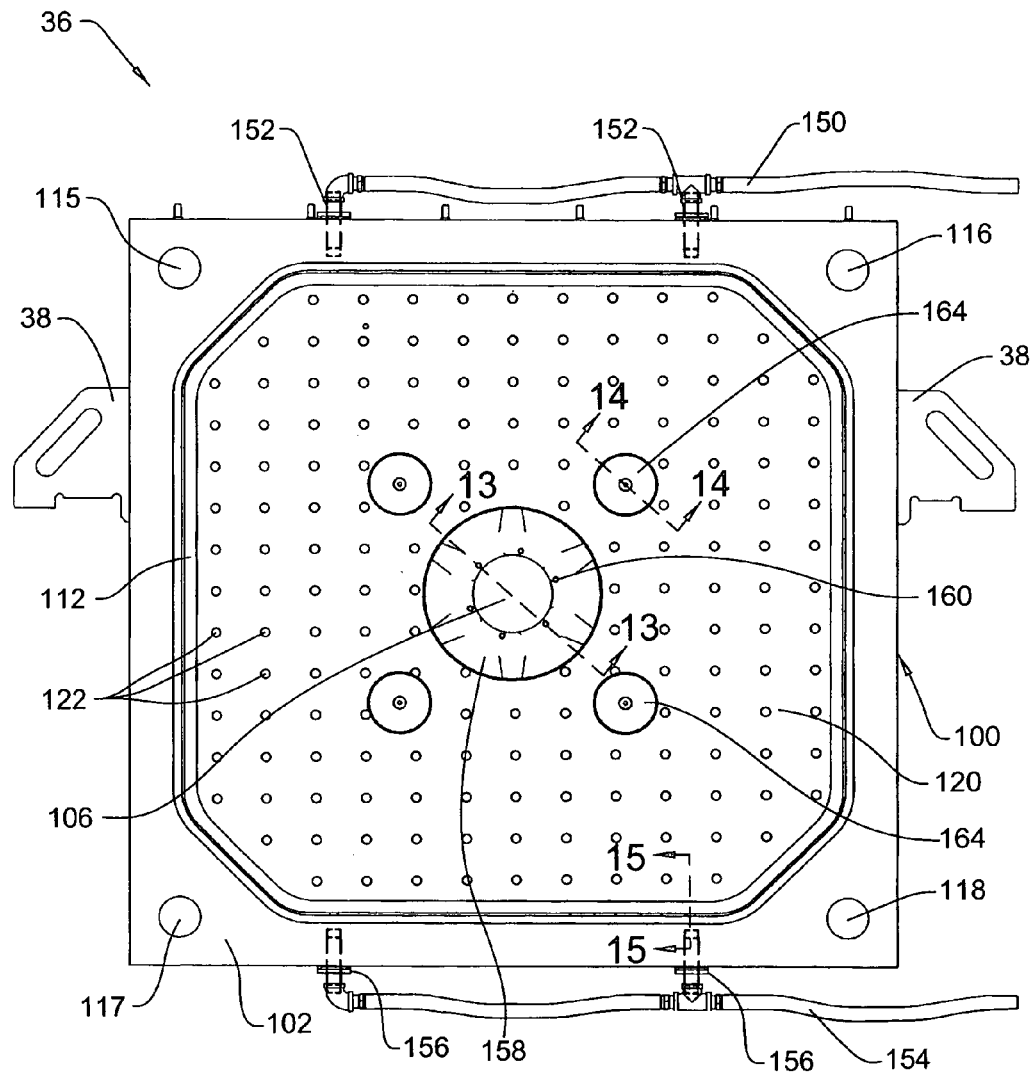
FIG. 12 is a front view of another embodiment of a temperature transfer filter plate assembly with the filter cloth removed.

FIG. 12 shows yet another embodiment of the invention. Elements in FIG. 12 corresponding to elements in the earlier figures include the same reference numerals and will not be discussed in detail herein. FIG. 12 shows the temperature transfer filter plate assembly 36 with the filter cloth removed therefrom. The temperature transfer filter plate 120 includes a plurality of apertures 122 as in the earlier embodiments. As utilized in the embodiment of FIGS. 4-10 (not shown) FIG. 12 illustrates hose 150, which connects through couplings 152 to each of the respective inlet/outlet connectors 124 that open into the respective temperature transfer plate chambers 140 of the pair of temperature transfer filter plates 120 of the temperature transfer filter plate assembly 36. Further, hose 154 includes couplings 156 that couple to the respective inlet/outlet connectors 124 of the pair of temperature transfer filter plates 120 on opposing sides of the divider wall 104. Thus, as discussed above, one of the hoses 150 provides a heating or cooling liquid from a fluid source to the pair of transfer plates 120 through inlet/outlet connectors 124. The liquid in the plate chambers 140 returns to the fluid source through respective other inlet/outlet connectors 124 acting as an exit path and connecting to hose 154. Thus, a complete fluid transfer circuit is formed so that a heating or cooling liquid is provided to the temperature transfer plate chambers 140 of the respective temperature transfer filter plates 120.

Figure 13:
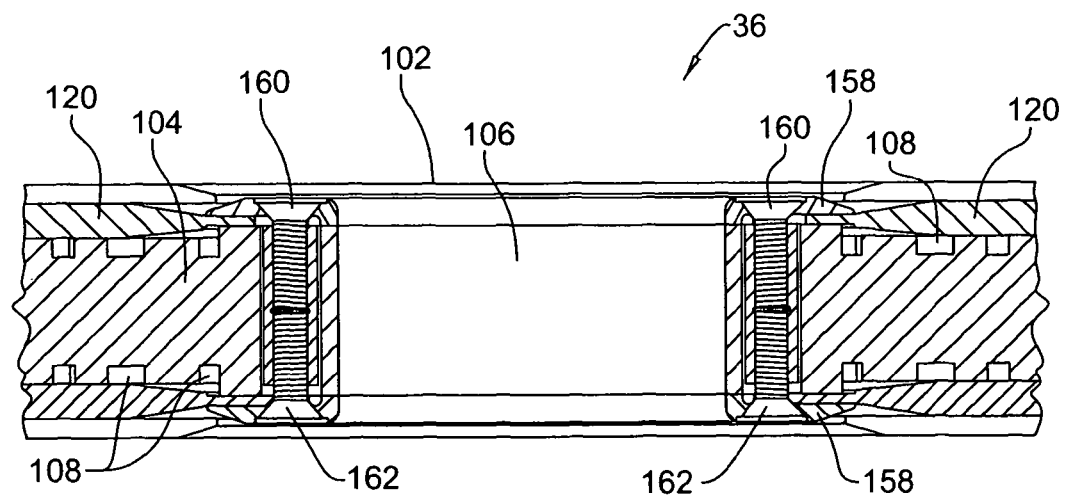
FIG. 13 is a partial cross-sectional view taken generally along 13-13 in FIG. 12.
Figure 14:
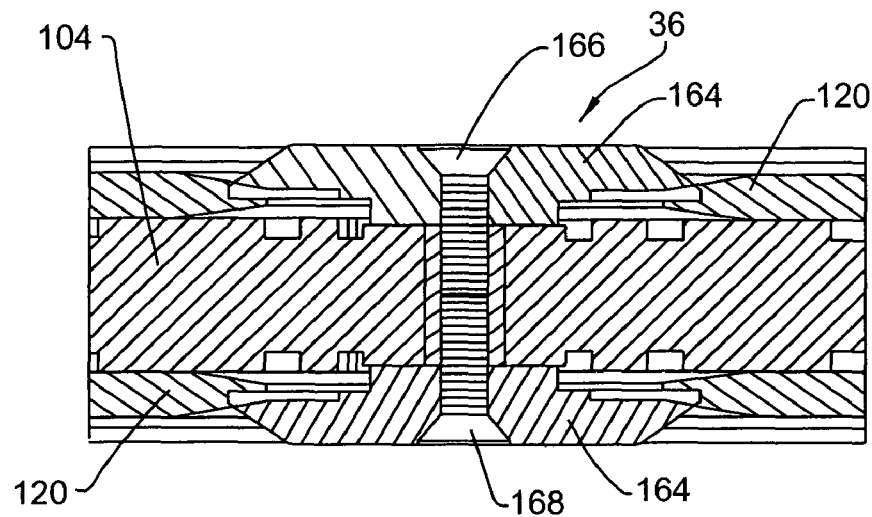
FIG. 14 is a partial cross-sectional view taken generally along 14-14 in FIG. 12.
Figure 15:
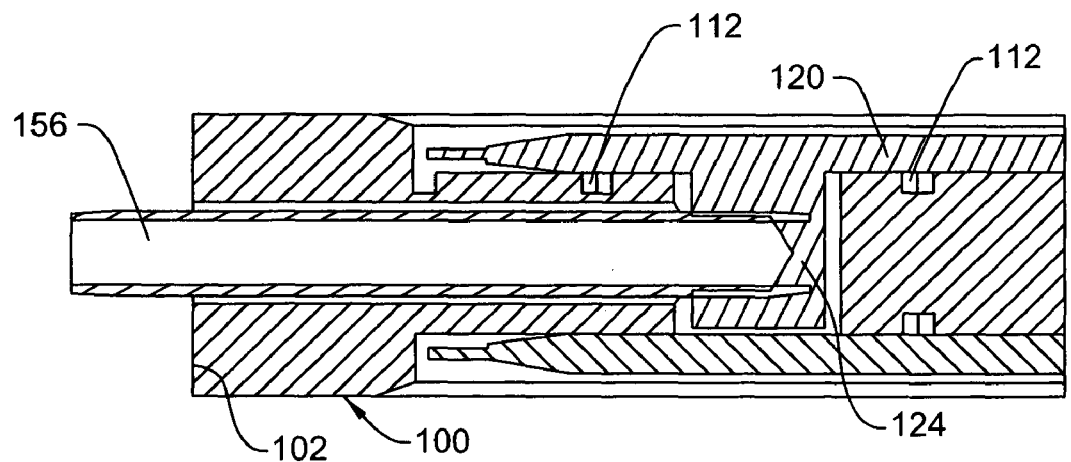
FIG. 15 is a partial cross-sectional view taken generally along 15-15 in FIG. 12.

The embodiment of FIGS. 12-15 has a different number of apertures 122 than in the earlier embodiments and additional support structure for the filter plate assembly 36. FIG. 13 shows a support arrangement about the center opening 106 of the temperature transfer filter plate assembly 36. In FIGS. 13-15, the temperature transfer filter plate 120 is shown as a solid element simply for purposes of illustration, and it will be appreciated that plate 120 includes a temperature transfer plate chamber 140 and a plurality of apertures 122 as discussed above.

For support purposes, a cover plate 158 extends along the outer perimeter of each end of the center opening 106. Cooperatively threaded bolts 160, 162 extend through aligned apertures in each cover plate 158 and through the divider wall 104 of the filter frame 100 to secure the cover plates 158 on the opposing sides of the center opening 106. In this embodiment, the cover plates 158 contact an outer edge of the heating plates 120 to support the plates on respective sides of the divider wall 104. Thus, the plurality of bolts 160 arranged about the perimeter of the center opening 106 as shown in FIG. 12 provide support for the temperature transfer filter plates 120 mounted on opposing sides of the center wall 104 of the temperature transfer filter frame 100.

FIG. 14 shows a support arrangement similar to that shown in FIG. 13. As illustrated in FIG. 12, the support arrangement includes opposing cover plates 164 on either side of the divider wall 104 and respective temperature transfer filter plates 120. The divider wall 104 and cover plates 164 once again have transverse aligned apertures therethrough. The apertures allow bolts 166, 168 to pass through opposing sides and join so as to seat the cover plates 164 on the outer walls of the respective temperature transfer filter plates 120. In this way, additional support is provided for the temperature transfer filter plates 120 mounted on opposing sides of the divider wall 104.

FIG. 15 shows how coupler 156 is joined to the inlet/outlet connector 124 of the temperature transfer filter plate 120. The coupler 156 includes a pipe that mounts through the peripheral edge portion 102 of the temperature transfer filter frame 100. The coupler 156 provides a connection between the temperature transfer hose 154 and the temperature transfer plate chamber 140 to provide a flow path from hose 154 through the temperature transfer plate chamber 140 and through coupler 152 to hose 150 for each of the temperature transfer filter plates 120.

The embodiment illustrated in FIGS. 12-15 mainly differs from the earlier described embodiment in that additional support for the temperature transfer filter plates 120 is provided.

Figure 16:
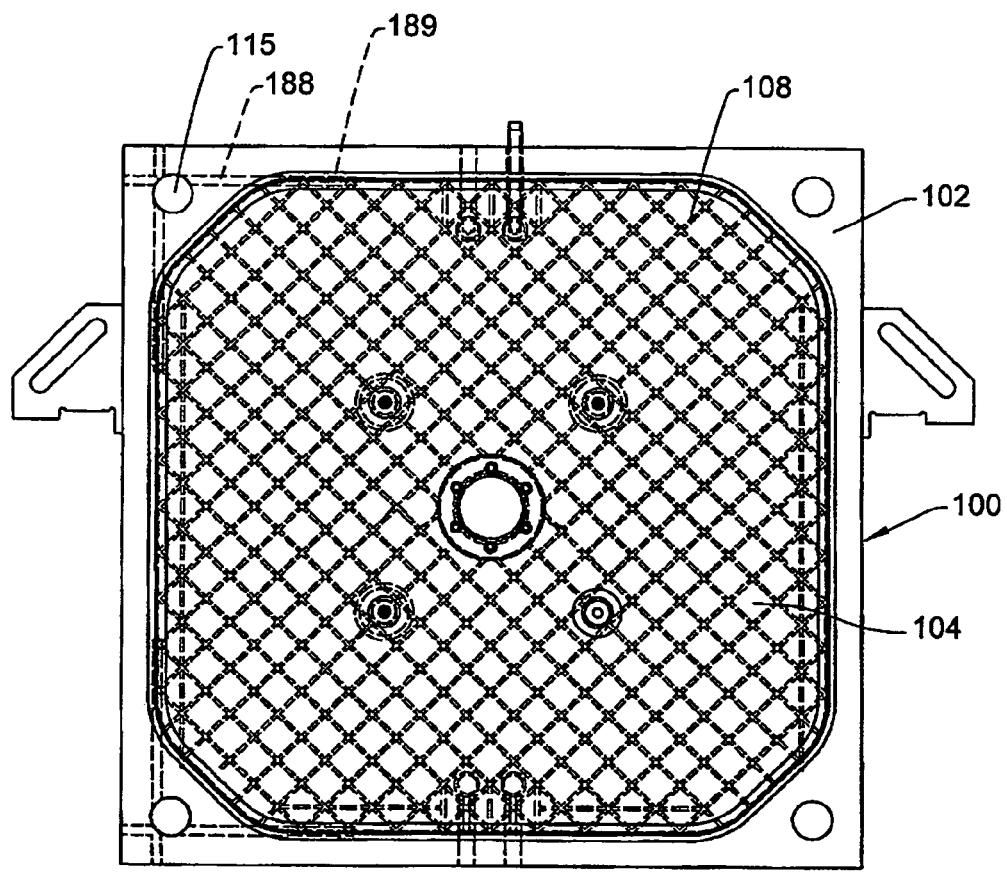
FIG. 16 is a front view of another embodiment of the temperature transfer filter plate assembly with the filter cloth and the temperature transfer filter plate removed.

FIG. 16 shows another embodiment of a temperature transfer filter frame 100 having a peripheral edge portion 102 and a divider or center wall 104. In this embodiment, shallow recesses 108 form a grooved pattern in the center wall 104. The grooved pattern, in combination with the undulating configuration of the inner wall 126 of the temperature transfer filter plate 120 enables the flow of liquid through the plurality of apertures 122 of the temperature transfer filter plate 120 and along the grooved pattern formed by the shallow recesses 108 to drainage passages opening into the filter plate assembly collecting chamber 129.

In the FIG. 16 embodiment, port 115 connects with closed-ended passage 188. Closed-ended passage 188 joins with ports or small passages 189 that open into the collecting chambers of the temperature transfer filter plate assembly. Liquid in the collecting chambers is removed through ports 189 via passage 188 to port 115.

Figure 17:
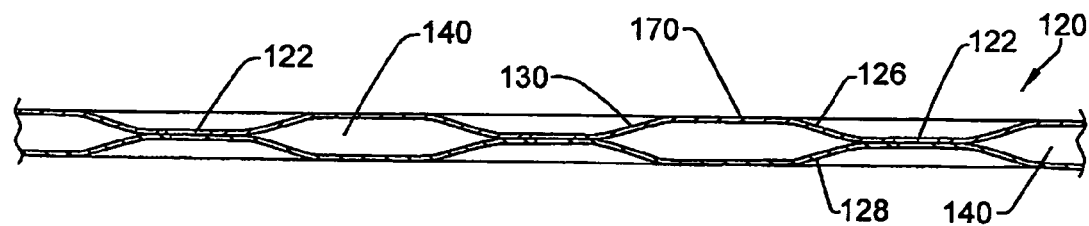
FIG. 17 is a partial cross-sectional view of another embodiment of the temperature transfer filter plate.

FIG. 17 shows another embodiment of the temperature transfer filter plate 120. In this embodiment, the wavy undulating configuration 130 is provided across the entire cross section of the filter plate 120. At portions where the temperature transfer plate chamber 140 has the greatest height, the inner and outer walls 126, 128 of the temperature transfer filter plate 120 may have a linearly flat surface 170. By narrowing the width of the temperature transfer filter plate 120, a narrower temperature transfer filter plate assembly 36 can be achieved. The temperature transfer filter plate 120 functions in the same manner as the above described filter plate.

Figure 18:
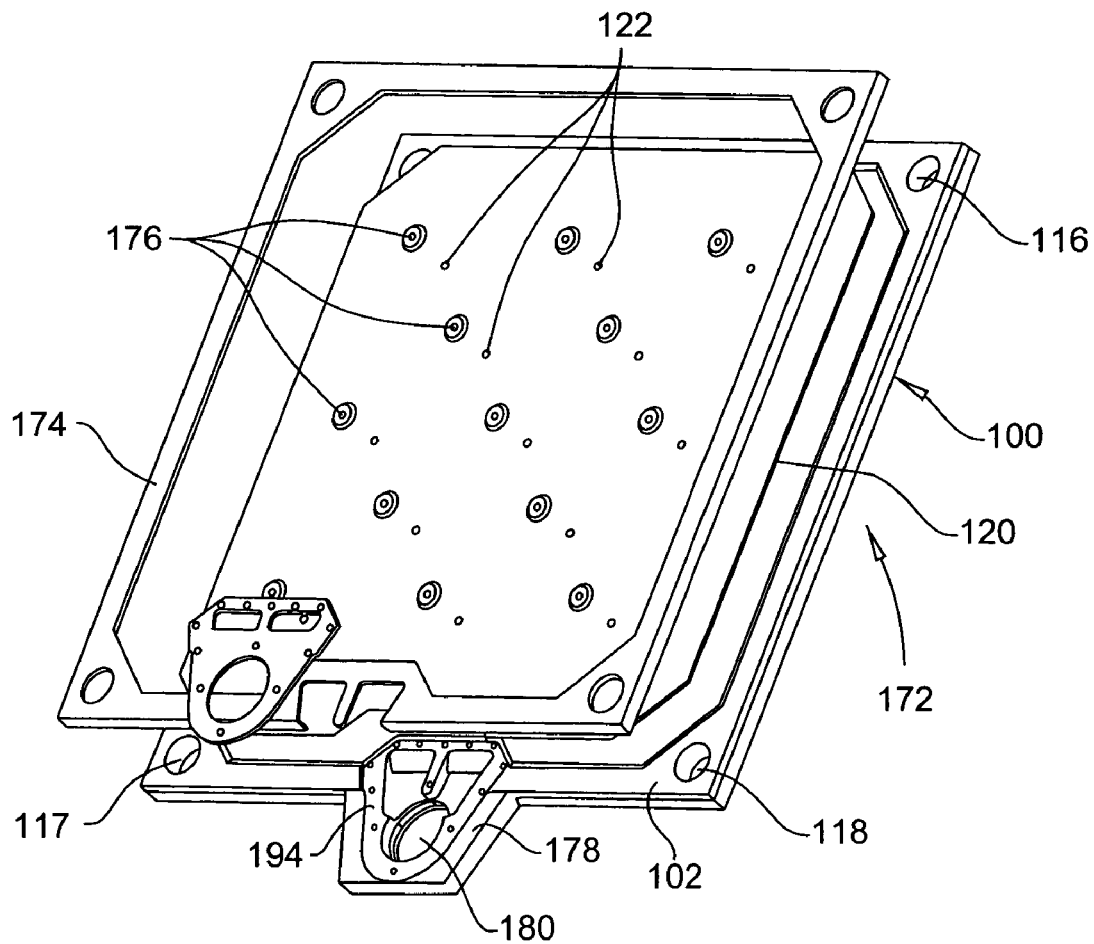
FIG. 18 is an exploded view of another embodiment of the temperature transfer filter plate assembly with the filter cloth removed except for the outer portion thereof.

FIGS. 18-21 show yet another embodiment of a temperature transfer filter plate assembly 172 of the invention. Elements in FIG. 18 corresponding to elements in the earlier figures include the same reference numerals and will not be discussed in detail herein. In FIG. 18, a latex outer mounting part 174 of the filter cloth is illustrated, but internal portions of the filter cloth are removed for illustration purposes. The outer mounting part 174 is another type of arrangement for mounting the filter cloth onto the peripheral edge portion 102 of the temperature transfer filter frame 100. The mounting part 174 extends about the temperature transfer filter plate 120 and mounts onto the peripheral edge portion 102 of the temperature transfer filter frame 100.

The embodiment of FIG. 18 includes a plurality of apertures 122 and a plurality of mounting bolts 176 extending through the temperature transfer filter plate 120. The apertures 122 shown in FIGS. 18 and 19 extend through the temperature transfer filter plate 120 as in the earlier embodiments.

The mounting bolts 176 can be the same as the mounting bolts 166 shown in the embodiment of FIGS. 12-15. In other embodiments, the mounting bolts 176 seat directly on the temperature transfer filter plate 120. As in the earlier embodiments, the plurality of mounting bolts 176 provide strength to the temperature transfer filter plate assembly 172, and especially when the slurry feed enters from the bottom thereof as discussed below.

As shown in FIG. 18, the temperature transfer filter frame 100 includes a protruding bottom structure 178. The protruding bottom structure 178 has a slurry opening 180 to allow slurry to pass therethrough as an alternative to the center-feed arrangement discussed above.

Figure 19:
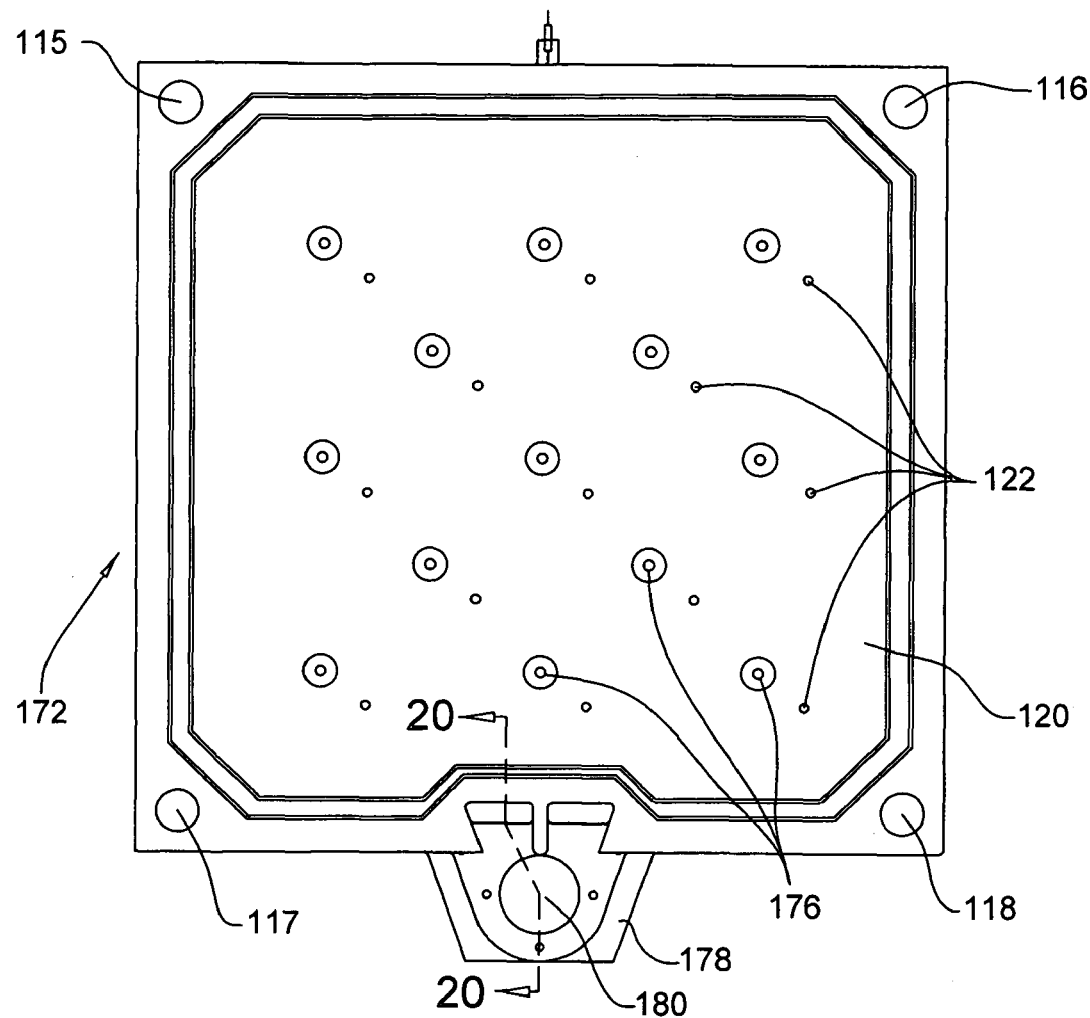
FIG. 19 is a front view of the filter plate assembly shown in FIG. 18.
Figure 20:
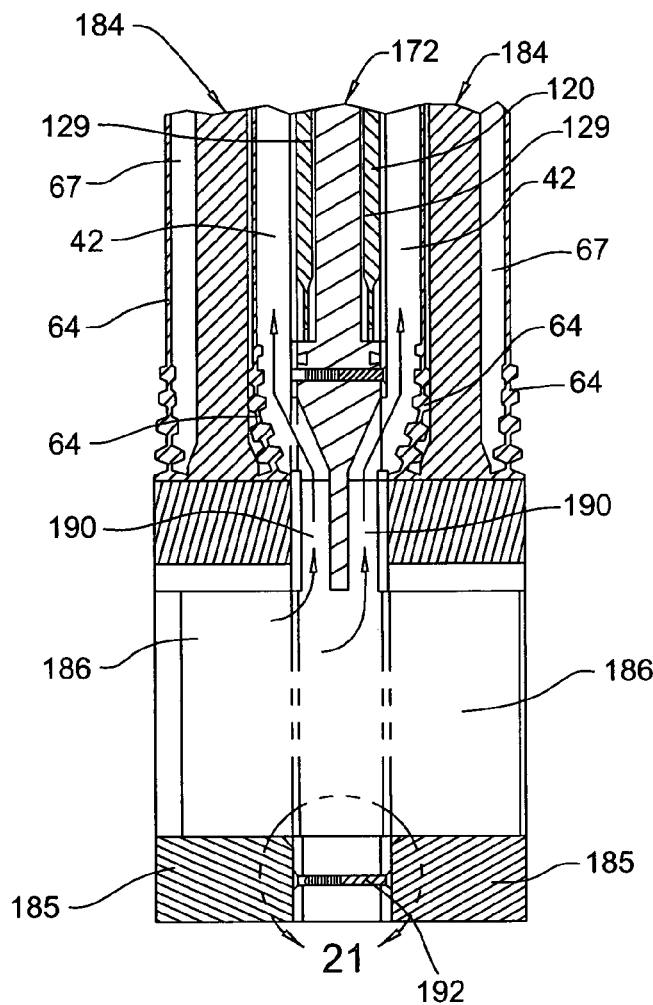
FIG. 20 is a cross-sectional view of a filter plate assembly stack including a pair of membrane filter plate assemblies with the temperature transfer filter plate assembly as seen generally along 20-20 in FIG. 19 located therebetween.

FIG. 19 shows a front view of the temperature transfer filter plate assembly 172 of FIG. 18, with the filter cloth removed, except for the outer mounting part 174, to enable viewing of the temperature transfer filter plate 120. FIG. 20 shows a portion of the filter plate assembly 172 of FIG. 19 with membrane plate assemblies 184 on opposite sides thereof. Each membrane filter plate assembly 184 in FIG. 20 includes a bottom protrusion structure 185 and a sludge or slurry opening 186 extending through the bottom protrusion structure 185 for feeding slurry therethrough. Filtration chambers 42 are located between the alternating membrane filter plate assemblies 184 and the temperature transfer filter plate assembly 172.

Figure 21:
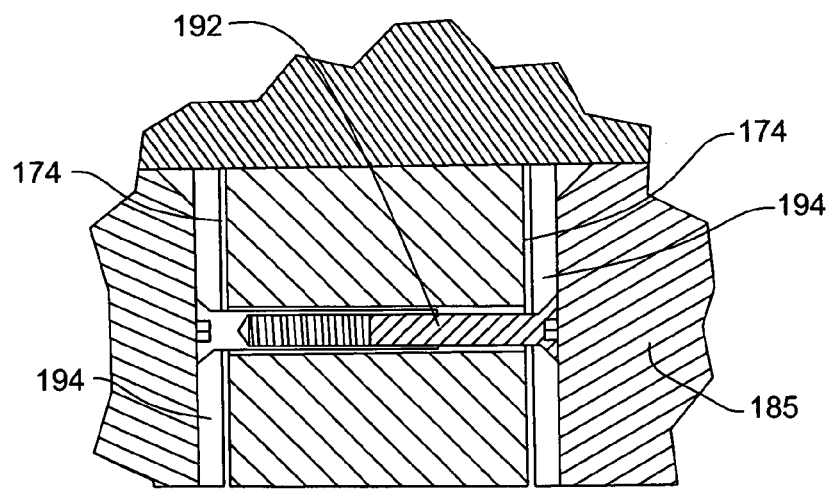
FIG. 21 is an enlarged partial cross-sectional view of the filter plate assembly taken generally along 21-21 in FIG. 20.

FIG. 21 shows an enlarged detail from FIG. 20 of a bolt apparatus 192 for mounting opposing cloth retainer plates 194 that secure the outer mounting parts 174 of filter cloths onto opposite sides of the temperature transfer filter plate assembly 172.

As in the earlier embodiments, the embodiment of FIGS. 19 and 20 includes the membrane filter plate assemblies 184 having squeeze chambers 67 for expanding flexible membranes or diaphragms 64. Further, the embodiment of FIG. 20 includes filter cloths (not shown) overlying the outer faces of the respective filter plate assemblies 172, 184.

The slurry openings 180, 186 provide a path for slurry along a stack of alternating filter plate assemblies 172, 184 in a similar manner to the center openings 56, 106 in the filter plate assemblies 34, 36 described above.

In operation, as shown in FIG. 20, slurry is fed through slurry openings 180, 186 and upwardly through slurry conduits 190 defined in the temperature transfer filter plate assembly 172. After the filtration chambers 42 are filled with slurry, the squeeze chambers 67 expand the flexible membranes 64 to apply pressure to the slurry present in the filtration chambers 42 as in the earlier described embodiments. Liquid travels through a filter cloth and through apertures 122 to enter the filter plate assembly collecting chamber 129. The liquid is then removed through selected ports and/or passages 115-118 shown in FIG. 19 in a manner similar to the arrangement discussed above with respect to the earlier embodiments.

The embodiment of FIGS. 18-21 operates in a similar manner as the embodiments discussed above, except for the absence of a central opening to receive slurry and the presence of the protruding bottom structures 178, 185 having respective slurry openings 180, 186 for the filter plate assemblies 172, 184. Thus, this embodiment will not be further discussed herein.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A temperature transfer filter plate assembly for a filter press for separating liquid from slurry, said temperature transfer filter plate assembly comprising:
   a rigid frame including a center wall and a peripheral edge portion disposed in surrounding relation with said center wall, said center wall having a width which is less than said peripheral edge portion;
   a pair of filter cloths disposed on respective opposing sides of said rigid frame; and
   a pair of temperature transfer filter plates disposed on opposing sides of said frame between the respective filter cloths and the center wall of said frame, each said temperature transfer filter plate having an inner wall and an outer wall defining a chamber therebetween for communicating with a supply of heated or cooled fluid for heating or cooling of slurry, liquid collecting chambers being defined between the inner wall of each said temperature transfer filter plate and the center wall of said frame, each said temperature transfer filter plate including a plurality of apertures extending through said inner wall and said outer wall, said apertures opening into said collecting chamber for allowing liquid to pass through said adjacent filter cloth and through said apertures into the collecting chamber.

2. The temperature transfer filter plate assembly of claim 1, wherein the outer wall of each said temperature transfer filter plate has an undulating configuration defined across the transverse cross section of said temperature transfer filter plate for forming said chamber for communicating with a supply of heated or cooled fluid.

3. The temperature transfer filter plate assembly of claim 2, wherein the inner wall of each said temperature transfer filter plate has an undulating configuration defined across the transverse cross section of said temperature transfer filter plate for forming said chamber for communicating with a supply of heated or cooled fluid.

4. The temperature transfer filter plate assembly of claim 1, said frame further comprising at least one drainage passage therein opening into each said collecting chamber for draining liquid from each said collecting chamber.

5. The temperature transfer filter plate assembly of claim 4, wherein faces at opposing sides of said center wall that form inner walls of the respective collecting chambers have a grooved or waffled pattern for assisting in moving liquid in the collecting chamber to said at least one drainage passage.

6. The temperature transfer filter plate assembly of claim 1, including a coating applied to substantially an entire face of a side of the inner wall of each said temperature transfer filter plate to reduce heat radiated inwardly therefrom.

7. The temperature transfer filter plate assembly of claim 2, wherein the outer wall of said temperature transfer filter plate comprises a first generally rectangular shaped metal plate including a first plurality of openings having a first diameter, and the inner wall comprises a second generally rectangular metal plate including a second plurality of openings having a second diameter greater than the first diameter, wherein the first metal plate is aligned with the second metal plate so that the first openings of the first metal plate define a lip extending inwardly about the entire circumference of the respective second openings, whereby each of the aligned first and second openings are sealed about the lip to form said apertures of said temperature transfer filter plate.

8. The temperature transfer filter plate assembly of claim 7, wherein the undulating configuration of said first and second metal plates of each said temperature transfer filter plate taken in transverse cross section is substantially symmetric.

9. The temperature transfer filter plate assembly of claim 1, further comprising first and second metal connectors joined to the respective inner wall of each said temperature transfer filter plate, each said first connector having an opening providing a flow path to the respective temperature transfer plate chamber and each said second connector having an opening providing a connection from the respective plate chamber with a fluid pipe that connects to a supply of heated or cooled fluid.

10. The temperature transfer filter plate assembly of claim 1, said temperature transfer filter plate assembly including a central passage for enabling flow of slurry through the temperature transfer filter plate assembly and to filtration chambers outward of the respective filter cloths on each side thereof.

11. The temperature transfer filter plate assembly of claim 1, wherein said frame has a projection extending outwardly from an edge thereof, said projection including a through passage for enabling flow of slurry through the temperature transfer filter plate assembly, said projection including entrance flow passages opening at a first end into said through passage and opening at a second end on each side of said frame for providing slurry to filtration chambers outward of the respective filter cloths on each side of said temperature transfer filter plate assembly.

12. The temperature transfer filter plate assembly of claim 1, said center wall of said rigid frame including inwardly projecting recesses on opposing sides thereof, and said temperature transfer filter plates are disposed adjacent the recesses on the respective sides of said center wall.

13. The temperature transfer filter plate assembly of claim 1, wherein each said filter cloth is secured to said frame at a frame section located between the peripheral edge portion and the center wall on each respective side of said frame, each said frame section surrounding outer peripheral edges of the adjacent said temperature transfer filter plate.

14. A temperature transfer filter plate assembly for a filter press for separating liquid from slurry, said temperature transfer filter plate assembly comprising:
   a rigid frame including a center wall and a peripheral edge portion disposed in surrounding relation with said center wall, said center wall having a width which is less than said peripheral edge portion of said frame;

a first temperature transfer filter plate comprising a first inner wall and a first outer wall forming a first plate chamber for communicating with a supply of heated or cooled fluid for heating or cooling of slurry, said first temperature transfer plate including a plurality of apertures extending through said first inner wall and a plurality of apertures extending through said first outer wall, said apertures of said first inner wall being in alignment with respective said apertures of said first outer wall so that said first inner wall and said first outer wall are sealed about the periphery of respective said apertures that are in alignment, to prevent fluid passing therethrough from entering the first plate chamber, said first temperature transfer filter plate being disposed on a first side of said frame adjacent a first side of said center wall for forming a first fluid collecting chamber between said first inner wall of said first temperature filter plate and said first side of said center wall, whereby fluid entering said apertures of said first temperature filter plate is provided to said first fluid collecting chamber;

a second temperature transfer filter plate comprising a second inner wall and a second outer wall forming a second plate chamber for communicating with a supply of heated or cooled fluid for heating or cooling of slurry, said second temperature transfer plate including a plurality of apertures extending through said second inner wall and a plurality of apertures extending through said second outer wall, said apertures of said second inner wall being in alignment with respective said apertures of said second outer wall so that said second inner wall and said second outer wall are sealed about the periphery of respective said apertures that are in alignment, to prevent fluid passing therethrough from entering the second plate chamber, said second temperature transfer filter plate being disposed on a second opposing side of said frame adjacent a second side of said center wall for forming a second fluid collecting chamber between said second inner wall of said second temperature filter plate and said second opposing side of said center wall, whereby fluid entering said apertures of said second temperature filter plate is provided to said second fluid collecting chamber;

a first permeable filter cloth having an inner surface and an outer surface, said first filter cloth being disposed outwardly from said first outer wall of said first temperature transfer plate, for forming a first cavity between said inner surface of said first filter cloth and said first outer wall of said first temperature filter plate; and a second permeable filter cloth having an inner surface and an outer surface, said second filter cloth being disposed outwardly from said second outer wall of said second temperature transfer plate, for forming a second cavity between said inner surface of said second filter cloth and said second outer wall of said second temperature transfer plate.

15. The temperature transfer filter plate assembly of claim 14, wherein the first outer wall of said first temperature transfer filter plate has an undulating configuration defined across the transverse cross section of said first temperature transfer filter plate and the first inner wall of said first temperature transfer filter plate has an undulating configuration defined across the transverse cross section of said first temperature transfer filter plate, said undulating configurations defining said chamber for communicating with a supply of heated or cooled fluid.

* * * * *